(12) United States Patent
Kah, III (10) Patent No.: US 10,815,958 B2
(45) Date of Patent: Oct. 27, 2020

(54) ADAPTER ELEMENT WITH INTEGRATED WATER TURBINE GENERATOR

(71) Applicant: Carl L. C. Kah, III, North Palm Beach, FL (US)

(72) Inventor: Carl L. C. Kah, III, North Palm Beach, FL (US)

(*) Notice: Subject to any disclaimer, the term of this patent is extended or adjusted under 35 U.S.C. 154(b) by 0 days.

(21) Appl. No.: 16/266,444

(22) Filed: Feb. 4, 2019

(65) Prior Publication Data
US 2019/0242355 A1 Aug. 8, 2019

Related U.S. Application Data

(60) Provisional application No. 62/625,707, filed on Feb. 2, 2018.

(51) Int. Cl.
| | |
|---|---|
| *F03B 1/04* | (2006.01) |
| *F03B 11/00* | (2006.01) |
| *H02K 7/18* | (2006.01) |
| *F16K 31/06* | (2006.01) |
| *F03B 13/00* | (2006.01) |
| *A01G 25/16* | (2006.01) |

(52) U.S. Cl.
CPC .............. *F03B 1/04* (2013.01); *A01G 25/16* (2013.01); *F03B 11/004* (2013.01); *F03B 13/00* (2013.01); *F16K 31/0655* (2013.01); *H02K 7/1823* (2013.01); *F05B 2220/20* (2013.01); *F05B 2220/32* (2013.01); *F05B 2220/602* (2013.01); *F05B 2220/7068* (2013.01); *F05B 2250/82* (2013.01)

(58) Field of Classification Search
CPC .......... F03B 1/04; F03B 11/004; A01G 25/16; F05B 2250/7068; F05B 2250/82
USPC ......................................... 290/54; 137/847.5
See application file for complete search history.

(56) References Cited

U.S. PATENT DOCUMENTS

| | | | |
|---|---|---|---|
| 4,963,780 A | 10/1990 | Hochstrasser | |
| 5,207,354 A * | 5/1993 | Hsu ...................... | A01G 25/162 137/119.07 |
| 6,036,333 A | 3/2000 | Spiller | |
| 6,876,100 B2 | 4/2005 | Yumita | |
| 7,694,934 B2 * | 4/2010 | Irwin .................... | F16K 31/402 137/242 |
| 8,230,871 B2 * | 7/2012 | Hurst ..................... | F16K 11/22 137/119.03 |
| 8,397,745 B2 * | 3/2013 | Hurst .................... | F16K 31/385 137/119.03 |
| 9,599,286 B2 * | 3/2017 | Hurst ....................... | F17D 3/00 |
| 10,088,849 B2 * | 10/2018 | Hurst ................... | G05D 7/0641 |
| 2004/0227425 A1 | 11/2004 | Murray | |
| 2005/0107924 A1 | 5/2005 | Bailey | |
| 2008/0029722 A1 | 2/2008 | Irwin | |

(Continued)

OTHER PUBLICATIONS

International Search Report and Written Opinion dated Written Opinion dated Apr. 25, 2019 issued in corresponding International Application No. PCT/US19/16488.

*Primary Examiner* — Pedro J Cuevas
(74) *Attorney, Agent, or Firm* — Amster, Rothstein & Ebenstein LLP (57) ABSTRACT

An adapter element for a solenoid valve assembly in an irrigation system includes an integral water turbine generator including an impeller positioned in an outlet flow path of a solenoid assembly thereof such that the impeller rotates when water flows to generate electricity.

14 Claims, 10 Drawing Sheets

(56) References Cited

U.S. PATENT DOCUMENTS

| | | | |
|---|---|---|---|
| 2008/0190488 A1* | 8/2008 | Hurst | F16K 11/22 |
| | | | 137/119.03 |
| 2008/0289693 A1 | 11/2008 | Irwin | |
| 2012/0222749 A1* | 9/2012 | Hurst | F16K 31/385 |
| | | | 137/12 |
| 2013/0008542 A1* | 1/2013 | Irwin | F16K 31/402 |
| | | | 137/859 |
| 2013/0048746 A1 | 2/2013 | Littrell | |
| 2013/0180599 A1* | 7/2013 | Hurst | F16K 31/385 |
| | | | 137/119.08 |
| 2013/0206242 A1* | 8/2013 | Hurst | G05D 7/03 |
| | | | 137/12 |
| 2015/0204454 A1* | 7/2015 | Hurst | F17D 3/00 |
| | | | 137/1 |
| 2016/0202708 A1 | 7/2016 | Hurst | |

* cited by examiner

ADAPTER ELEMENT WITH INTEGRATED WATER TURBINE GENERATOR

CROSS-REFERENCE TO RELATED APPLICATIONS

The present application claims benefit of and priority to U.S. Provisional Patent Application Ser. No. 62/625,707 entitled ADAPTER ELEMENT WITH INTEGRATED WATER TURBINE GENERATOR filed Feb. 2, 2018, the entire content of which is hereby incorporated herein.

BACKGROUND

Field of the Disclosure

The present invention relates to an adapter element for use with a solenoid valve assembly in an irrigation system where the adapter element includes an integrated water turbine generator to provide electrical power when water flows through the solenoid valve assembly.

Related Art

Irrigation controllers typically control irrigation systems by opening and closing valves in the system selectively to provide a desired watering program. In some systems, there are areas that require irrigation and have access to a source of pressurized water, however, are removed from a continuous supply of power, such a AC line voltage, for example. In this case, the system may utilize a battery operated irrigation controller, at least to control irrigation in that area. In general, the batteries in such controllers need to be changed on an annual basis, however, they may need to be replaced more often depending on the irrigation needs of the area. Checking battery status and changing batteries on a relatively frequent basis is time consuming and inconvenient.

Some irrigation systems use a solar powered controller in areas that lack access to a continuous power source. In this case, the batteries of the controller may be recharged using solar panels. Solar panels, however, introduce additional problems. One problem that the use of solar powered controllers introduces is placement. In particular, the solar panels must be placed in a location with consistent exposure to sunlight on a year round basis. This poses a challenge to positioning the controller, since plant growth over the course of time may change quite dramatically such that a good position in the winter may not be a good position in the summer or the following winter.

Accordingly, it would be desirable to provide an alternative power source for use with an irrigation controller that is independent of a continuous power source provided by a line voltage, for example.

SUMMARY

It is an object of the present disclosure to provide an adapter element that includes an integrated water turbine and is configured to place the water turbine generator in the flow path of a solenoid assembly, typically used in irrigation systems such that the flow of water during the course of normal operation of the system will generate electricity. In embodiments, the generated electricity may be used to recharge batteries of an irrigation controller that controls the solenoid assembly and valve assembly, and/or other valve assemblies. While the electricity is preferably used to recharge an irrigation controller, it may be used for any other suitable purpose.

In particular, in accordance with an embodiment of the present disclosure, the turbine generator is mounted in the adapter element which is configured for use with a valve assembly of the type commonly used in irrigation systems to start and stop the flow of water to different irrigation stations. Thus, the adapter element and turbine generator of the present disclosure may be easily used in conjunction with existing irrigation systems.

An adapter for use with a solenoid valve assembly in accordance with an embodiment of the present disclosure includes a cylindrical housing including: an inlet channel extending between a bottom of the cylindrical housing and a top thereof; an outlet channel extending between a bottom of the cylindrical housing and a top thereof; a turbine receptacle provided in a side of the cylindrical housing adjacent to the outlet channel; a turbine generator configured for insertion into the turbine receptacle and including: an impeller positioned in the outlet channel such that the impeller rotates when water flows through the outlet channel; a rotor connected to the impeller that rotates with the impeller, the rotor including a plurality of magnets; and a conductor coil formed around the impeller such that rotation of the plurality of magnets induces an electric current in the coil; and at least one electrical lead connected to the conductor coil to provide an external electrical connection.

A solenoid valve assembly in accordance with and embodiment of the present disclosure includes a valve assembly including: an inlet configured to receive pressurized water; a diaphragm component, movable from a closed position in which it prevents flow and an open position in which it allows flow of water; an outlet, configured to allow water to escape the valve assembly; a solenoid assembly including: a chamber in fluid communication with the inlet; a plunger movable from a closed position in which it blocks the flow of water from the chamber and an open position in which it allows the flow of water from the chamber, wherein the plunger is movable based on energizing a solenoid including the plunger; and an adapter positioned between the valve assemble and the solenoid assembly including: a cylindrical housing including: an inlet channel extending between a bottom of the cylindrical housing and a top thereof; an outlet channel extending between a bottom of the cylindrical housing and a top thereof; a turbine receptacle provided in a side of the cylindrical housing adjacent to the outlet channel; a turbine generator configured for insertion into the turbine receptacle and including: an impeller positioned in the outlet channel such that the impeller rotates when water flows through the outlet channel; a rotor connected to the impeller that rotates with the impeller, the rotor including a plurality of magnets; and a conductor coil formed around the impeller such that rotation of the plurality of magnets induces an electric current in the coil; and at least one electrical lead connected to the conductor coil to provide an external electrical connection.

BRIEF DESCRIPTION OF THE DRAWINGS

The above and related objects, features and advantages of the present disclosure will be more fully understood by reference to the following, detailed description of the preferred, albeit illustrative, embodiment of the present invention when taken in conjunction with the accompanying figures, wherein.

DETAILED DESCRIPTION OF THE EXEMPLARY EMBODIMENTS

Conventional water turbine generators are provided in dedicated housings and positioned along a irrigation supply line in irrigation systems. These conventional turbine generators are a part of the supply line and typically include a pressure activated bypass valve that may be triggered to divert the flow of water around the turbine when flow exceeds a required amount. The conventional turbines also commonly include filtration upstream of the turbine to filter out debris that may damage or prevent operation of the turbine. As a result, the housings for these conventional turbines tend to be rather large and bulky as they require several distinct stages.

Figure 1:
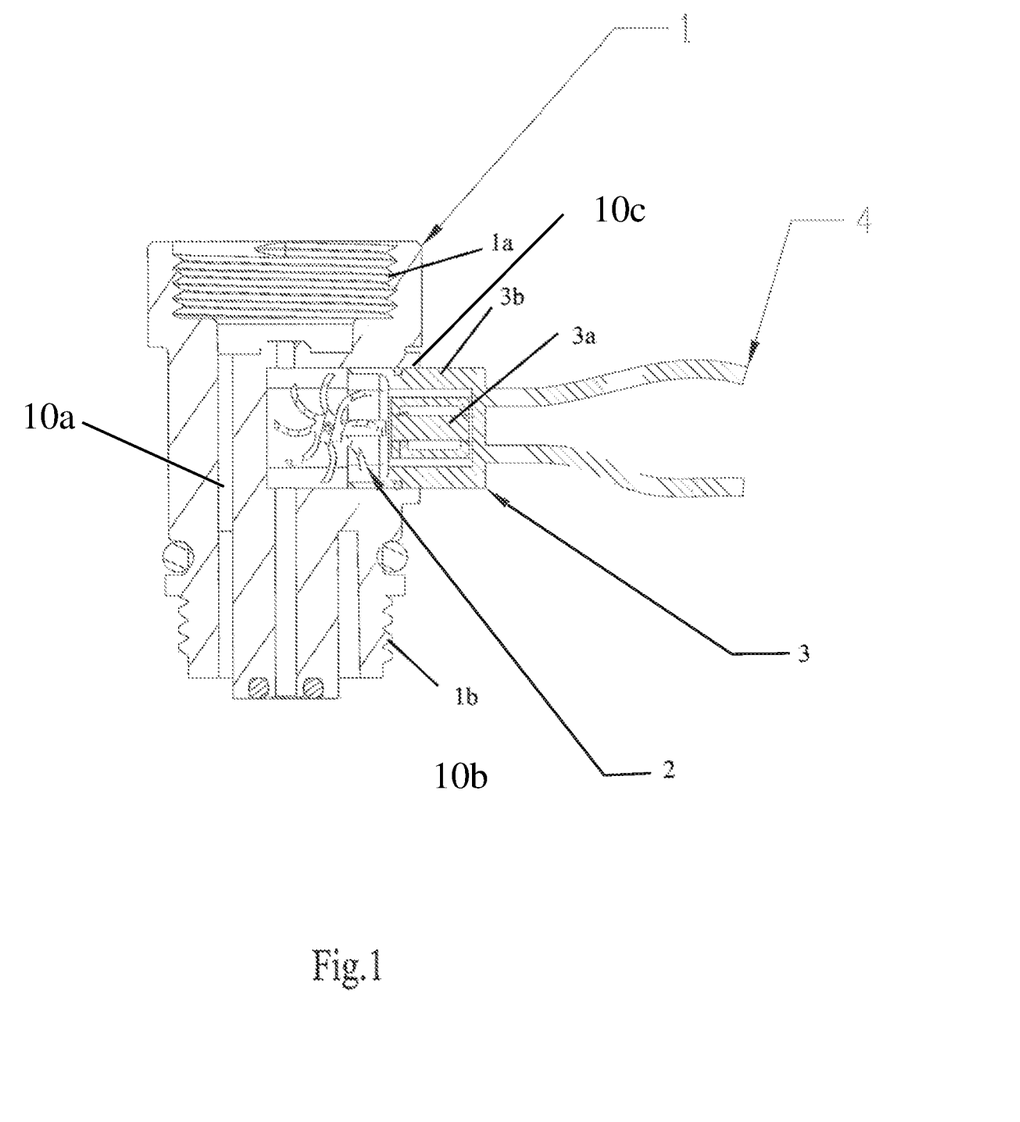
FIG. 1 illustrates a cross-sectional view of an adapter element including a water turbine generator in accordance with an exemplary embodiment of the present disclosure.

FIG. 1 illustrates an exemplary embodiment of an adapter element 1 in accordance with an embodiment of the present disclosure. In embodiments, the adapter element 1 is configured for installation with a conventional solenoid valve assembly in an irrigation system, which would not be possible in view of the bulky housings required by existing water turbines. The adapter element 1 includes a water turbine generator 3 that generates electricity as water flows through the adapter 1. An electrical connection to the turbine generator 3 may be provided via the conducting leads 4 which may be used to provide power external to the generator.

In embodiments, the adapter element 1 includes a substantially cylindrical body 10 with an inlet channel 10a and outlet channel 10b formed therein. In embodiments, the turbine generator 3 is mounted in a turbine receptacle 10c, which is preferably formed through one side of the body 10 adjacent to the outlet channel 10b. While the body 10 is illustrated as cylindrical, other shapes may be used.

Figure 2:
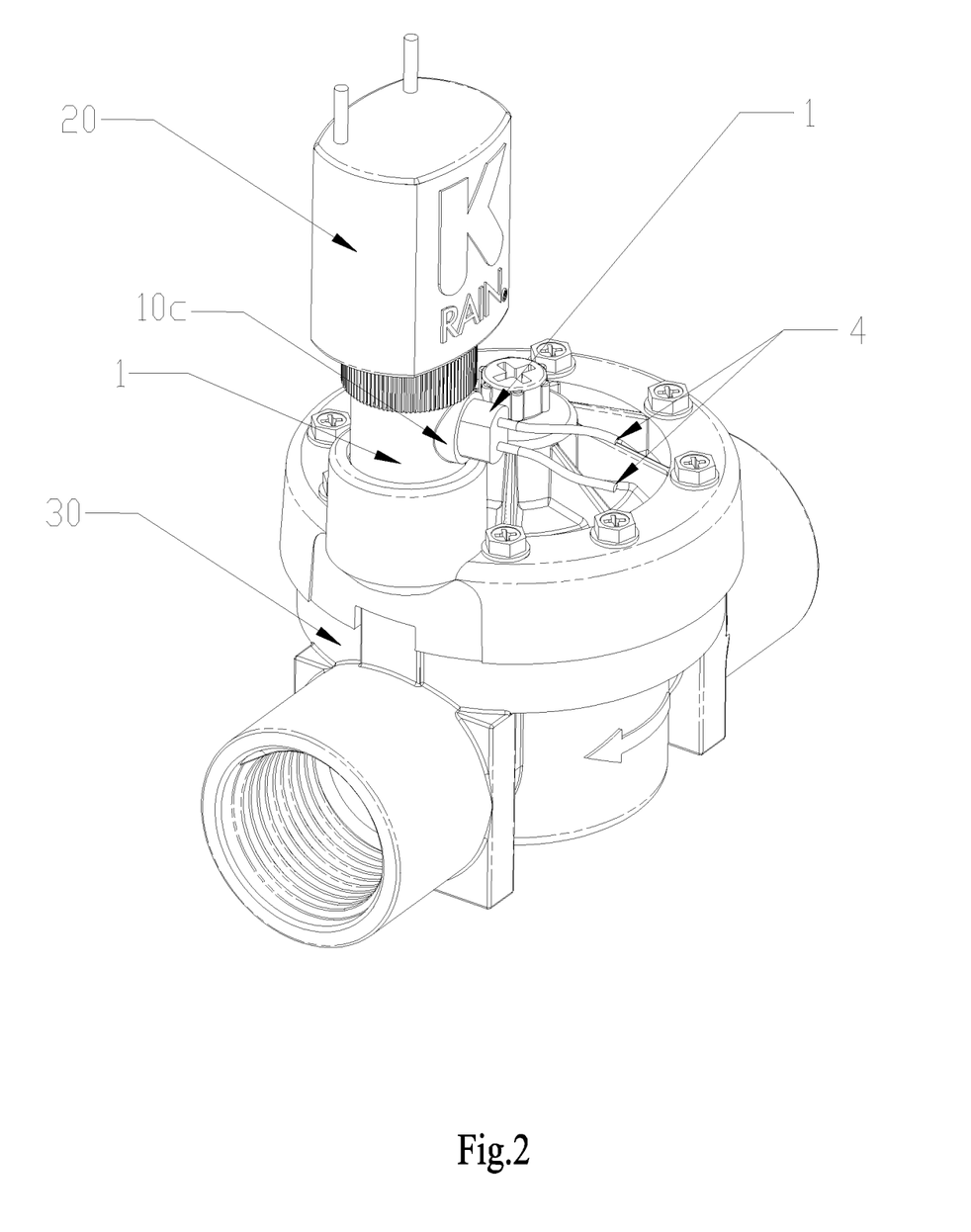
FIG. 2 illustrates the adapter element of FIG. 1 positioned between a solenoid assembly and valve assembly of an irrigation system in accordance with an exemplary embodiment of the present disclosure.
Figure 2A:
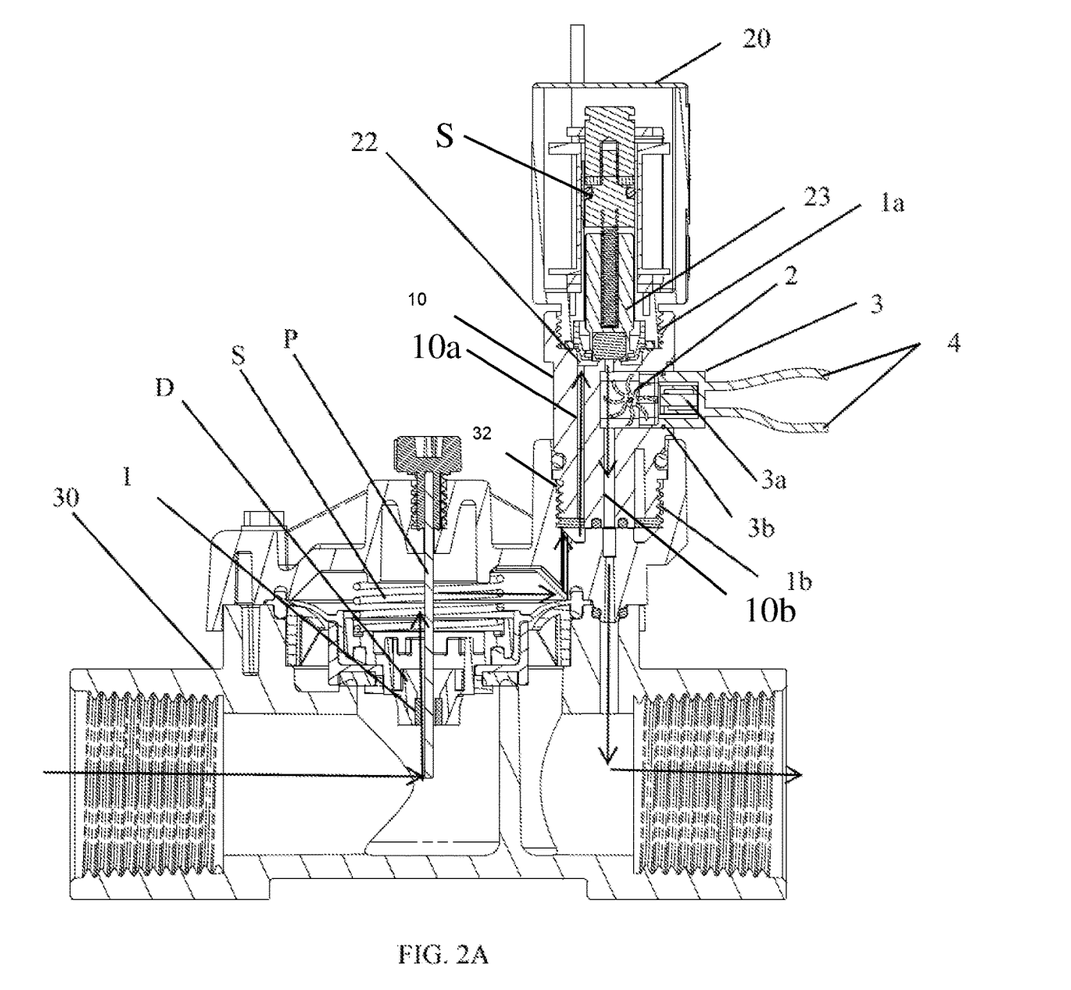
FIG. 2A illustrates a cross-sectional view of the adapter element of FIG. 1 positioned between a solenoid assembly and valve assembly of an irrigation system in accordance with an exemplary embodiment of the present disclosure.
Figure 2B:
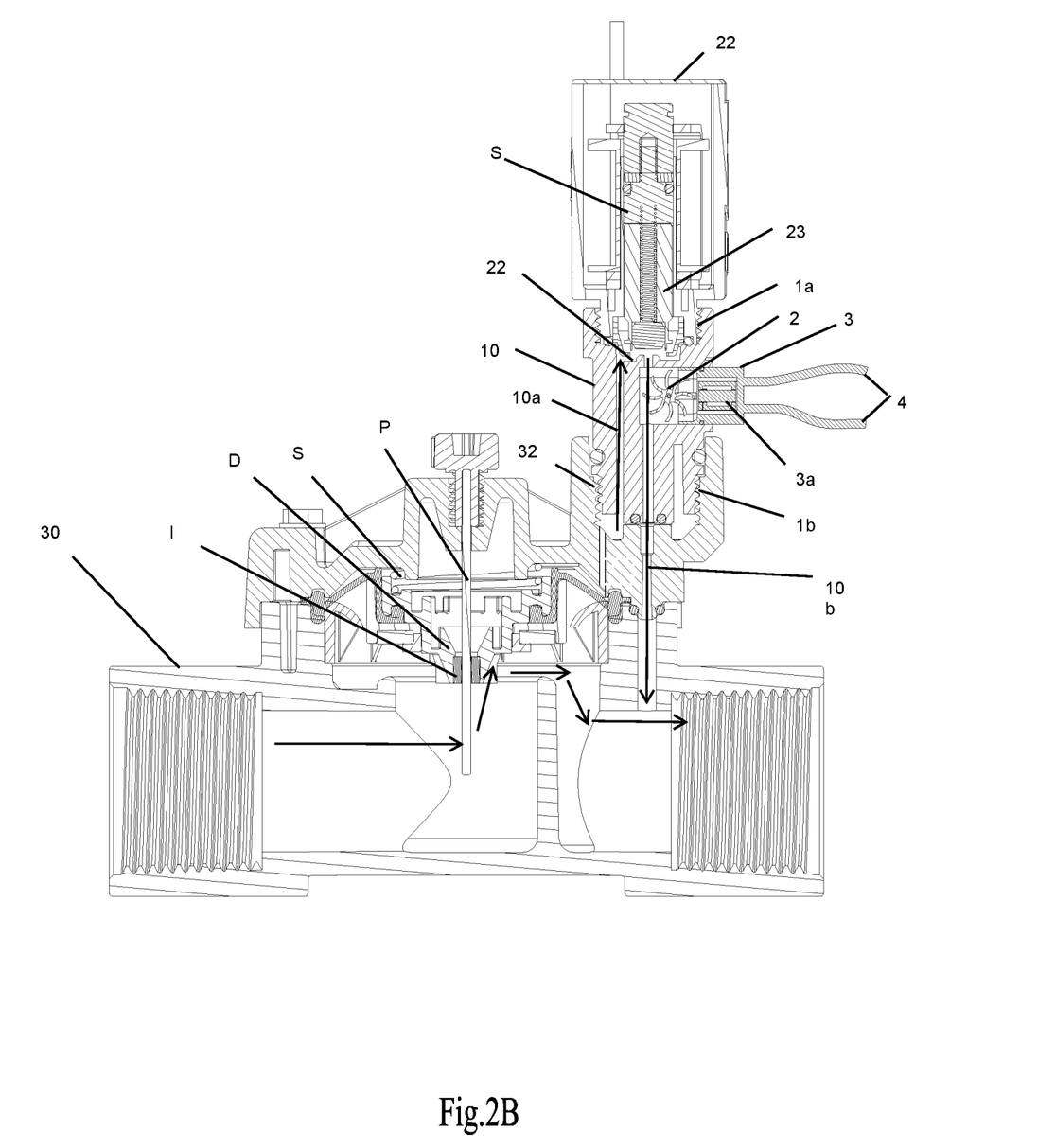
FIG. 2B is a cross-sectional view of the adapter element of FIG. 1 in position between a solenoid assembly and valve assembly of a solenoid valve element of an irrigation system in accordance with an exemplary embodiment of the present disclosure.

FIG. 2A illustrates the adapter element 1 connected between a solenoid assembly 20 and valve assembly 30 in an exemplary irrigation system. In embodiments, the solenoid assembly 20 controls flow of water through the valve assembly 30. FIG. 2B illustrates a cross-sectional view of this arrangement. In embodiments, the adapter 1 is configure for insertion between the valve assembly 30 and solenoid assembly 20 without interrupting operation of either of these elements such that the adapter 1 may be used to retrofit existing irrigation systems.

Figure 3:
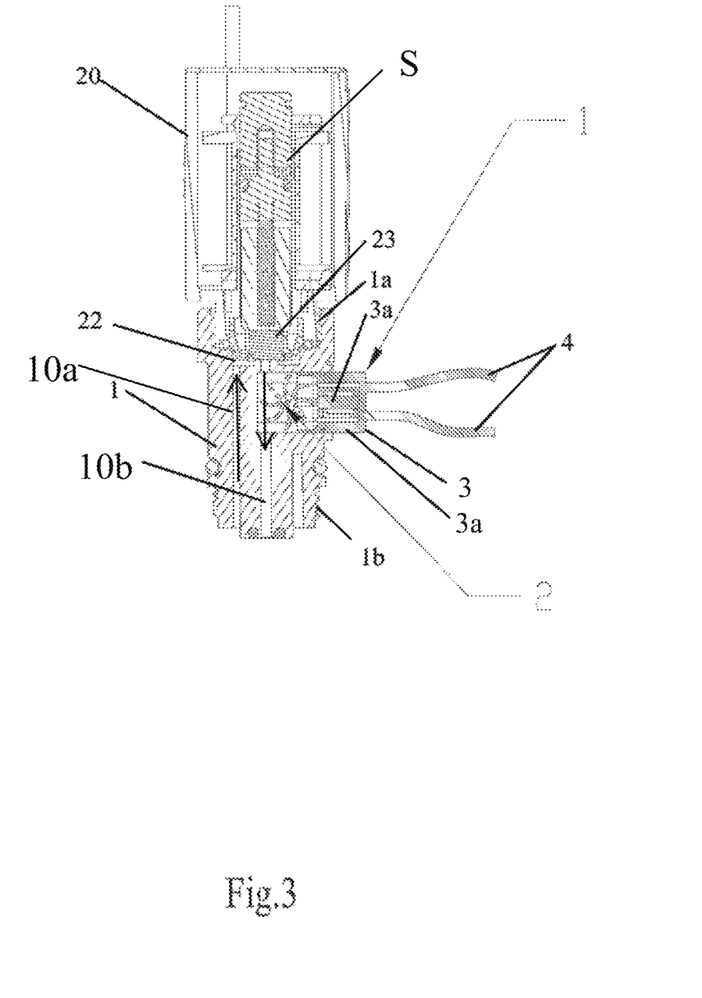
FIG. 3 is a cross-sectional view of the adapter element of FIG. 1 connected to a solenoid assembly, with the plunger of the solenoid in a closed position in accordance with an exemplary embodiment of the present disclosure.
Figure 4:
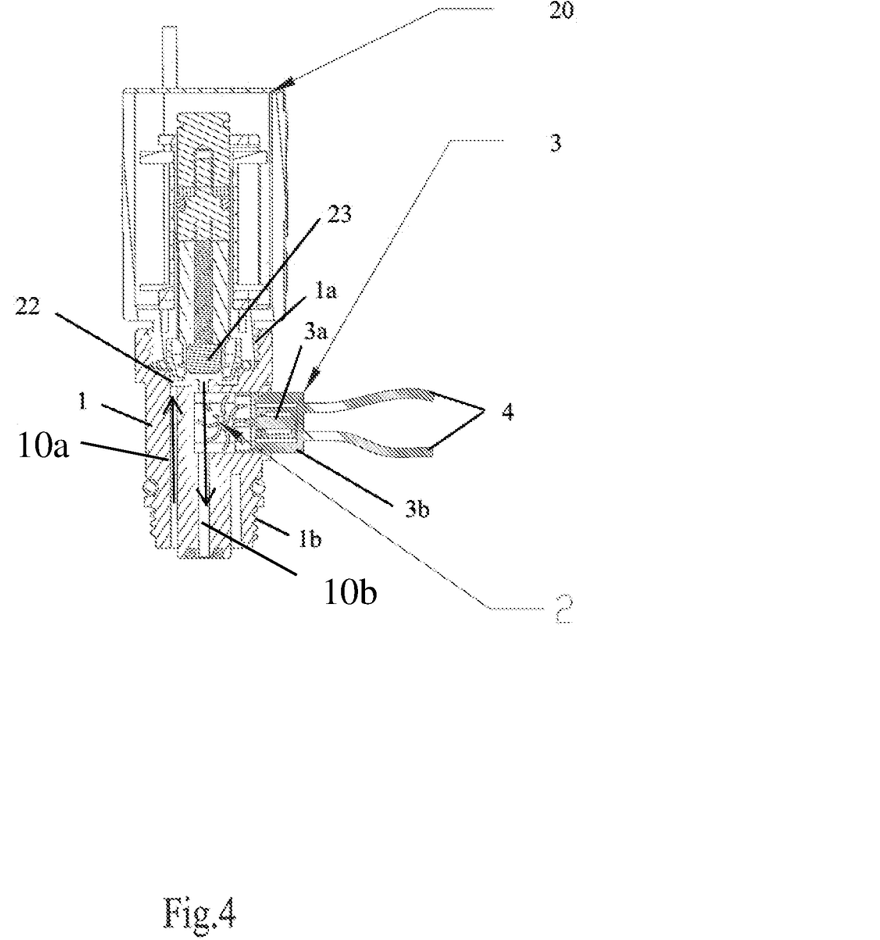
FIG. 4 is a cross-sectional view of the adapter element of FIG. 1 connected to a solenoid assembly, with the plunger of the solenoid in an open position in accordance with an exemplary embodiment of the present disclosure.

FIG. 3 illustrates a cross-sectional view of the adapter element 1 connected to the solenoid assembly 20. As indicated by the arrows in FIG. 2A, water flows up the inlet channel 10a of the adapter 1 into the chamber 22 of the solenoid assembly 20. In FIG. 2A, the plunger 23 of the solenoid assembly 20 is in the closed position which prevents water in the chamber 22 from entering the outlet channel 10b of the adapter 1. FIG. 4 illustrates the plunger 23 in the open position such that water in the chamber 22 flows out through the outlet channel 10b and through the impeller 2 of the turbine generator 3. The impeller 2 rotates as water flows through it. In embodiments, the impeller 2 rotates a rotor that includes one or more magnets 3a, which induce a current in coil 3b surrounding the magnets. The rotor, magnets and coil are provided in a portion of the turbine generator that is water proof and isolated from the impeller 2. In embodiments, water proofing may be provided by potting the components thereof. In embodiments, the coil 3b is electrically connected to the leads 4 such that the generated current may be provided to an electric device outside of the adapter 1. In embodiments, the turbine generator 3 may be adapted to provide a desire current. In embodiments, the turbine generator will provide a minimum current of 0.5 amps.

In embodiments, the plunger 23 is biased into the closed position of FIG. 3 such that flow of water through the valve assembly 30 is prevented. When the solenoid assembly 20 is energized, the plunger 23 is lifted upward into the open position, illustrated in FIG. 4, for example, and the valve assembly 30 opens to allow the flow of water therethrough. As illustrated, the top portion of the cylindrical housing 10 of the adapter 1 includes internal threads 1a that are configured to correspond to external threads 10d provided on the outer surface of the lower portion of the solenoid assembly 20. In embodiments, the adapter element 1 is securely connected to the solenoid assembly 20 without the need for any modification thereof. While threads 1a are illustrated in FIGS. 1, 2A, 3 and 4, any suitable connection may be provided between the adapter 1 and the solenoid assembly 20.

The cross-sectional view of FIG. 2B illustrates the adapter 1 connected between the valve assembly 30 and the solenoid assembly 20 with the plunger 23 of the solenoid assembly 20 in an open position such that water flow through the valve assembly, and the adapter 1, is permitted. When the valve assembly 30 is operating (open) as in FIG. 2B, the diaphragm D is open (raised) to allow water to pass. The diaphragm D opens when the plunger 23 is in the open (raised) position to allow water to flow through the outlet channel 10b, thus reducing the pressure above the diaphragm D and allowing the diaphragm to move up based on the pressure provided by the incoming flow of water into the valve assembly 30. When the plunger 23 moves back down (closed position), it prevents the flow of water through the channel 10b such that water remains in the space above the diaphragm D to hold the diaphragm down in the closed position, along with the bias of the spring S, as illustrated in 2A. It is noted that since the water that flows into the adapter element 1 and valve assembly 30 must pass through the small clearance between the metering pin P and the insert I of the diaphragm D, the water is largely free of debris such that additional filtering in the adapter element 1 is unnecessary.

The bottom portion of the adapter body 10 of the adapter element 1 includes exterior threads 1b configured to cooperate with the interior threads 32 of the valve assembly 30 such that the adapter 1 connects to the valve assembly 30 without modification thereof. While threads are illustrated, any suitable connection may be provided between the adapter 1 and the valve assembly. The arrows in FIG. 2A illustrate water flow from the inlet of the valve assembly 30 through the opening between the metering pin P and insert I into the space above the diaphragm D. When the plunger 23 is raised in the open position, water flows into the adapter 1, through the inlet channel 10a and into the chamber 22 and then back down outlet channel 10b through the impeller 2 of the turbine generator 3 and to the outlet of the valve assembly 30. The water flow through the impeller 2 rotates the impeller to generate electricity.

Figure 5:
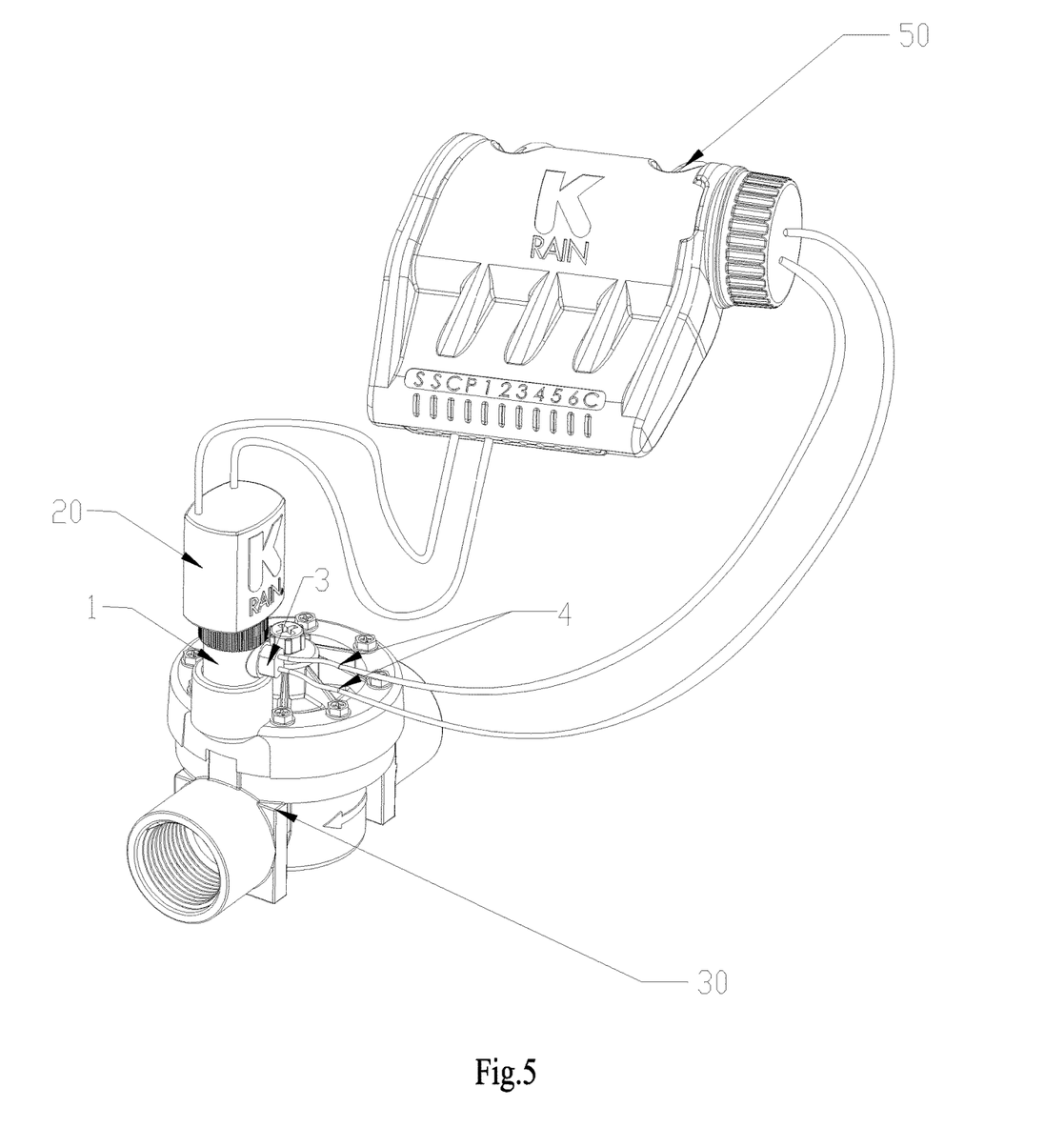
FIG. 5 illustrates the adapter element of FIG. 1 in position between a solenoid assembly and valve assembly where the solenoid is connected to and controlled by an exemplary irrigation controller that is powered by the turbine generator of the adapter.
Figure 5A:
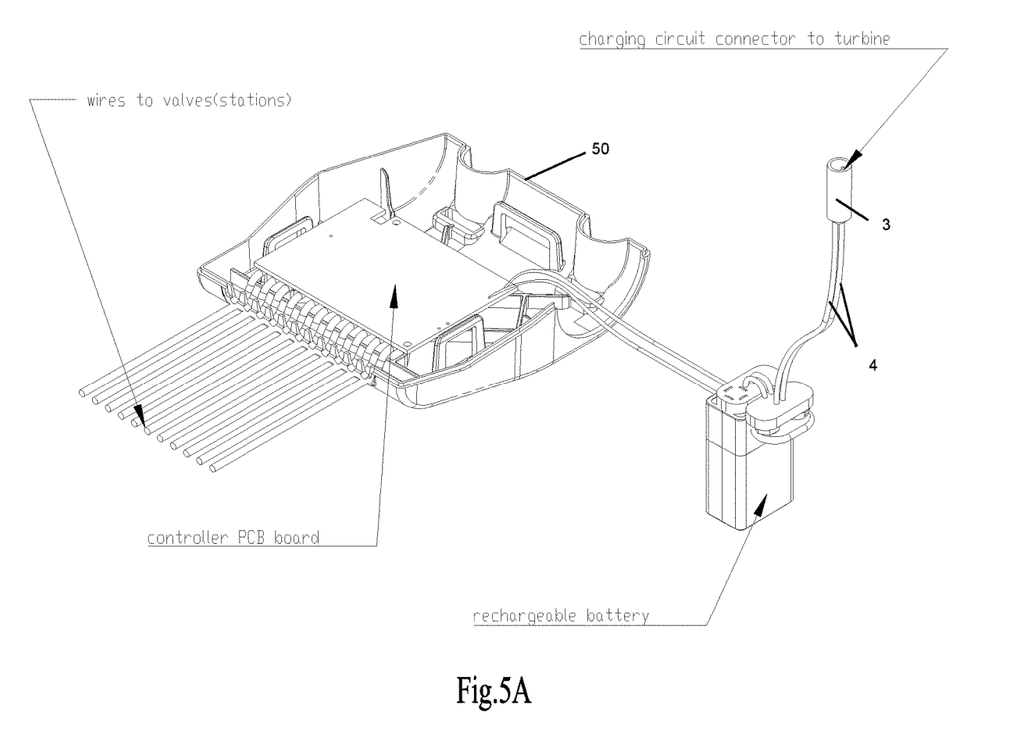
FIG. 5A illustrates an exemplary embodiment of an irrigation controller and its battery which may be recharged by the adapter element of FIG. 1.

FIG. 5 illustrates an exemplary irrigation controller 50 connected to the leads 4 of the turbine generator 3. In embodiments, the turbine generator 3 provides power for recharging a battery (see FIG. 5A) of the controller 50. In embodiments, as indicated in FIG. 5A, the controller 50 may include a rechargeable battery that is connected to the generator 3. In embodiments, the controller 50 may use any another power storage element, such as a capacitor or capacitor array, to name a few. In embodiments, the electricity generated by the turbine generator 3 may be used to power the controller 50 directly.

Figure 6:
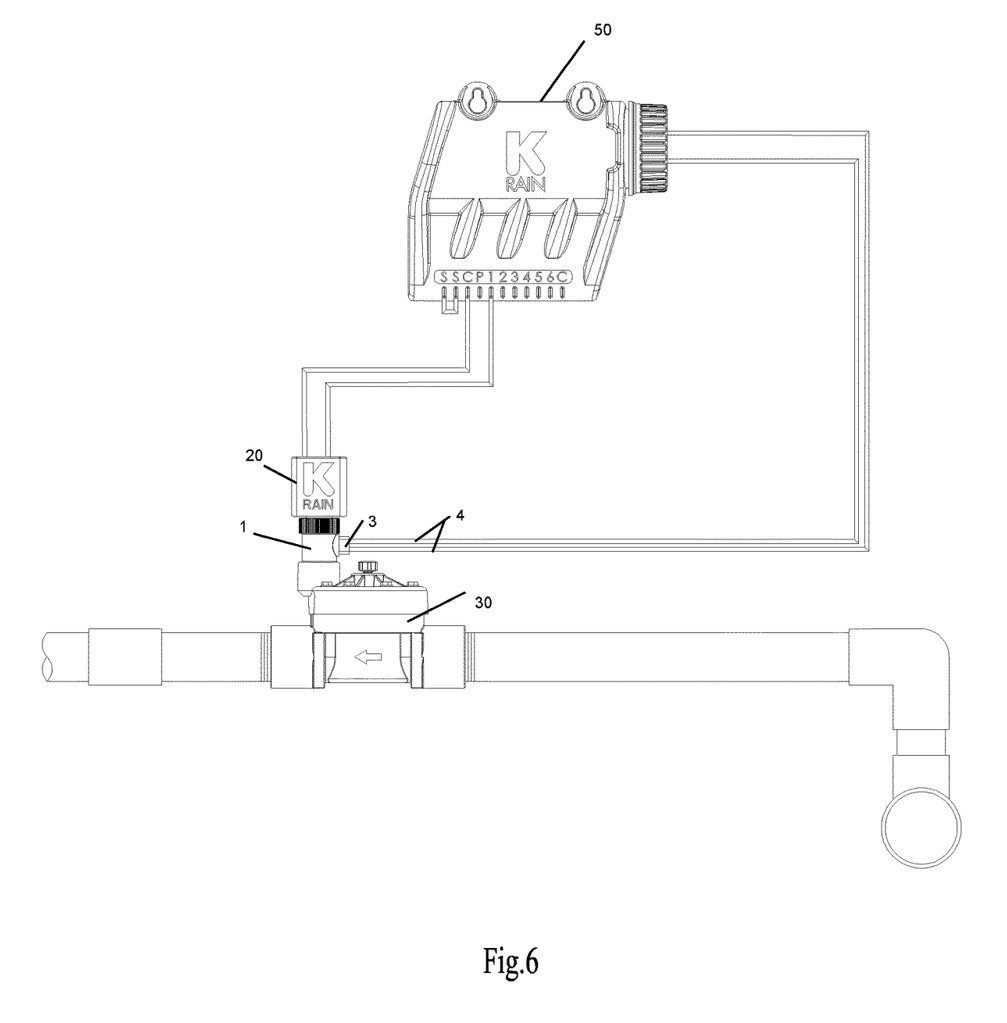
FIG. 6 illustrates the adapter element connected to an exemplary controller and in position in an exemplary irrigation line.
Figure 7:
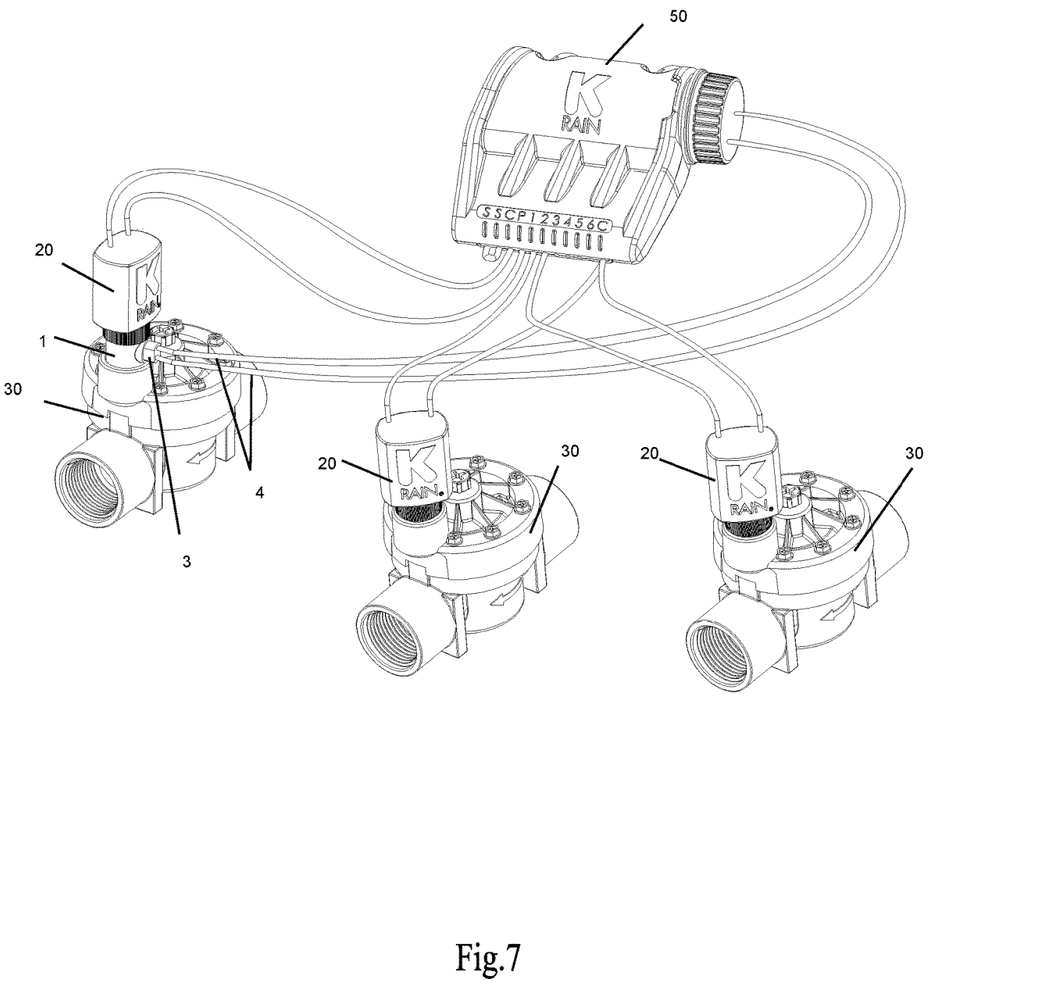
FIG. 7 illustrates an adapter element connected to an exemplary controller that controls multiple valves.

The controller 50 is connected to the solenoid assembly 20 to control the plunger 23 which moves between the open (raised) and closed (lowered) position to start and stop the flow of water through the valve assembly 30. The valve assembly 30 is preferably positioned in a water supply line for one or more irrigation stations as can be seen in FIG. 6, for example. The flow of water through the valve 30 determines whether watering is occurring at the irrigation stations supplied by that line. The controller 50 may be connected to additional valve assemblies 30 (or solenoids 20) to control watering at multiple irrigation stations as indicated in FIG. 7, for example. These additional valve assemblies 30 need not be paired with the adapter 1 since the power provided by the turbine generator 3 of the adapter 1 should be sufficient to recharge the batteries of the controller 50, or otherwise power controller 50 even if the controller is controlling additional valve assemblies and solenoids 20. If desired, an adapter 1 may be included with the other valve assemblies 30, to provide additional power either to the controller 50 or for any other desired purpose. As noted above, while the power from the turbine generator 3 of the adapter element 1 is preferably used to power an irrigation controller, it may be used for any other desired purpose, for example, powering landscape lighting.

The flow rate through the adapter element 1 may be adjusted, if desired, by varying the pressure drop across the valve assembly 30. In one example, this can be done by changing the diaphragm spring S of the valve assembly 30. Alternatively, in a valve assembly that provides flow control, the flow control element may be used to vary the flow through the adapter 1.

Although the present invention has been described in relation to particular embodiments thereof, many other variations and modifications and other uses will become apparent to those skilled in the art. Steps and units described in relation to one aspect of the method or system may be added, or substituted, for steps or units described with respect to another aspect of the system. Combinations and permutations of steps different from those outlined are also contemplated. Steps outlined in sequence need not necessarily be performed in sequence, not all steps need necessarily be executed, and other intervening steps may be inserted. It is preferred, therefore, that the present invention be limited not by the specific disclosure herein.

What is claimed is:

1. An adapter element for use with a solenoid valve assembly comprising:
    a cylindrical housing including:
        an inlet channel extending between a bottom of the cylindrical housing and a top thereof;
        an outlet channel extending between a bottom of the cylindrical housing and a top thereof;
        a turbine receptacle provided in a side of the cylindrical housing adjacent to the outlet channel;
        a turbine generator configured for insertion into the turbine receptacle and including:
            an impeller positioned in the outlet channel such that the impeller rotates when water flows through the outlet channel;
            a rotor connected to the impeller that rotates with the impeller, the rotor including a plurality of magnets; and
            a conductor coil formed around the impeller such that rotation of the plurality of magnets induces an electric current in the coil; and
        at least one electrical lead connected to the conductor coil to provide an external electrical connection.

2. The adapter of claim 1, wherein the cylindrical body includes an open top end including a first thread formed on an internal surface thereof, wherein the internal thread is configured to mate with a solenoid thread of a solenoid assembly to connect the adapter to the solenoid assembly.

3. The adapter of claim 2, wherein the cylindrical body includes an open bottom end including a second thread formed on an external surface thereof and configured to mate with a valve thread of a valve assembly to connect the adapter to the valve assembly.

4. The adapter of claim 3, wherein the inlet channel is configured to be in fluid communication with an inlet side of a valve element and a chamber of the solenoid assembly such that water flows from the inlet side of the valve assembly through the inlet channel and to the chamber of the solenoid assembly.

5. The adapter of claim 3, wherein the outlet channel is configured to be in fluid communication with a chamber of the solenoid assembly on a top end thereof and with an outlet side of the valve assembly at a bottom end thereof such that water flows from the chamber of the solenoid assembly through the outlet channel and the impeller and down to the outlet side of the valve assembly.

6. The adaptor of claim 1, where the at least one conducting lead is configured for connection to an irrigation controller.

7. The adaptor of claim 1, wherein the rotor, plurality of magnets and conducting coils of the turbine generator are provided in a water proof portion of the turbine generator.

8. A solenoid valve assembly comprising:
   a valve assembly including:
      an inlet configured to receive pressurized water;
      a diaphragm component, movable from a closed position in which it prevents flow and an open position in which it allows flow of water;
      an outlet, configured to allow water to escape the valve assembly;
   a solenoid assembly including:
      a chamber in fluid communication with the inlet;
      a plunger movable from a closed position in which it blocks the flow of water from the chamber and an open position in which it allows the flow of water from the chamber, wherein the plunger is movable based on energizing a solenoid including the plunger; and
   an adapter positioned between the valve assembly and the solenoid assembly including:
   a cylindrical housing including:
      an inlet channel extending between a bottom of the cylindrical housing and a top thereof;
      an outlet channel extending between a bottom of the cylindrical housing and a top thereof;
      a turbine receptacle provided in a side of the cylindrical housing adjacent to the outlet channel;
   a turbine generator configured for insertion into the turbine receptacle and including:
      an impeller positioned in the outlet channel such that the impeller rotates when water flows through the outlet channel;
      a rotor connected to the impeller that rotates with the impeller, the rotor including a plurality of magnets; and
      a conductor coil formed around the impeller such that rotation of the plurality of magnets induces an electric current in the coil; and at least one electrical lead connected to the conductor coil to provide an external electrical connection.

9. The solenoid valve assembly of claim 8, wherein the cylindrical body of the adapter element includes an open top including a first thread formed on an inner surface thereof, wherein the internal thread is configured to mate with a solenoid thread of the solenoid assembly to connect the adapter to the solenoid assembly.

10. The adapter of claim 9, wherein the cylindrical body includes an open bottom end including a second thread formed on an external surface thereof and configured to mate with a valve thread of the valve assembly to connect the adapter to the valve assembly.

11. The adapter of claim 10, wherein the inlet channel is configured to be in fluid communication with an inlet side of the valve element and a chamber of the solenoid assembly such that water flows from the inlet side of the valve assembly through the inlet channel and to the chamber of the solenoid assembly.

12. The adapter of claim 10, wherein the outlet channel is configured to be in fluid communication with the chamber of the solenoid assembly on a top end thereof and with an outlet of the valve assembly at a bottom end thereof such that water flows from the chamber of the solenoid assembly through the outlet channel and the impeller and down to the outlet side of the valve assembly.

13. The adaptor of claim 10, where the at least one conducting lead is configured for connection to an irrigation controller.

14. The adaptor of claim 10, wherein the rotor, plurality of magnets and conducting coil of the turbine generator are provided in a water proof portion of the turbine generator.

* * * * *